United States Patent [19]

Kikuchi et al.

[11] Patent Number: 4,613,072
[45] Date of Patent: Sep. 23, 1986

[54] APPARATUS FOR HEATING FLUID BY BURNING LIQUID FUEL

[75] Inventors: Kunio Kikuchi, Odawara; Hidetoshi Umehara, Yaita, both of Japan

[73] Assignee: Mikuni Kogyo Kabushiki Kaisha, Tokyo, Japan

[21] Appl. No.: 747,824

[22] Filed: Jun. 24, 1985

[30] Foreign Application Priority Data

Jul. 31, 1984 [JP] Japan ............... 59-116414[U]

[51] Int. Cl.[4] ........................................ B60H 1/02
[52] U.S. Cl. ..................... 237/12.3 C; 122/448 R; 237/2 A; 237/12.3 A; 431/18
[58] Field of Search ............ 237/12.3 C, 12.3 B, 237/12.3 A, 2 A; 122/448 R, 448 S, 446; 431/18

[56] References Cited

U.S. PATENT DOCUMENTS

| | | | |
|---|---|---|---|
| 4,274,265 | 6/1981 | Okumura | 237/12.3 C X |
| 4,411,385 | 10/1983 | Lamkewitz | 237/12.3 C X |
| 4,519,772 | 5/1985 | Mittman | 237/12.3 C X |
| 4,520,258 | 5/1985 | Grohmann | 237/12.3 B X |

Primary Examiner—Edward G. Favors
Attorney, Agent, or Firm—Pahl, Lorusso & Loud

[57] ABSTRACT

An improved apparatus for heating fluid by burning liquid fuel is disclosed. To heat fluid such as water, air or the like medium heat exchanging is effected between the combustion chamber in which liquid fuel is burnt with combustion air introduced therein and the fluid passage through which fluid to be heated flows. The apparatus includes means for controlling rotational speed of a single motor for rotating the fuel pump and the blower, means for controlling a flow rate of fuel to be pumped from the fuel pump, means for controlling a flow rate of combustion air and an electronic control unit into which a variety of parameters relative to the above-mentioned means are inputted. The parameters are processed in the electronic control unit to individually control the means for controlling rotational speed of the motor, the means for controlling a flow rate of fuel and the means for controlling a flow rate of combustion whereby heat exchanging therebetween is achieved without fluctuation in temperature of fluid. Typically, the parameters are rotational speed of the motor and flow rate of fuel pumped from the fuel pump. The parameters may be those as selected from a group of atmosphere pressure, temperature of combustion air, voltage of electric current, temperature of fluid before and behind heating and required heating temperature of fluid.

6 Claims, 6 Drawing Figures

APPARATUS FOR HEATING FLUID BY BURNING LIQUID FUEL

BACKGROUND OF THE INVENTION

1. Field of the Invention

The present invention relates to an apparatus for heating fluid by burning liquid fuel and more particularly to improvement of or relating to an apparatus for heating fluid such as water, air or the like medium in which the amount of thermal energy generated by combustion of liquid fuel, that is, the amount of fuel which is burnt can be changed while normal combustion state is maintained. The apparatus of the invention is preferably mounted on a motorcar or like vehicle.

2. Description of the Prior Art

To facilitate understanding of the present invention conventional apparatus will be described below with reference to FIGS. 5 and 6. FIG. 5 illustrates the case where the fluid to be heated is air and FIG. 6 the case where the fluid to be heated is water. As is apparent from the drawings, the conventional apparatus is so constructed that a mechanical type fuel pump 100 (metering pump with a plunger used therefor), a combustion air blower 102, a centrifugal type fuel distributor 104 and a blower 106 for forcibly circulating air to be heated (FIG. 5) or a water pump 108 (FIG. 6) are rotationally driven by means of a single motor 110. As the motor 110 is rotated, combustion air as identified by double line marks is caused to enter the cylindrical combustion chamber 114 and combustion gas generated by combustion in the latter is then discharged through the discharge port 116. At the same time fluid to be heated as identified by single line arrow marks is introduced into the apparatus by means of the blower 106 or the water pump 108 so that it is heated while it flows along the outer surface of the combustion chamber 114. Then, the heated fluid is discharged from the apparatus. The conventional apparatuses as described above are disclosed in Japanese Registered Pat. No. 226006 (Japanese Patent Publication No. 5116/1956).

The conventional apparatuses of the type of which rotational components are driven by means of a single motor have the following advantageous features.

(1) Since the driving means requiring electric power is constituted merely by a single motor, the apparatus can be manufactured at an inexpensive cost.

(2) Rotational speed of a motor varies as voltage of electric power varies, because the rotational components as mentioned above are rotated at the same rotational speed by means of a single motor. Since flow rate of fuel and flow rate of combustion air vary in proportion to rotational speed, there is no fluctuation in ratio of combustion air to fuel irrespective of how the rotational speed of the motor varies. Therefore, the combustion state is not adversely affected.

(3) As mentioned above, the amount of thermal energy generated by combustion varies without an occurrence of abnormal combustion due to fluctuation of voltage of electric current; however, the flow rate of fluid discharged from the blower or water feeding pump varies in proportion to variation of voltage of electric current. Therefore, fluctuation in temperature of fluid to be heated is avoided.

(4) When the flow of fluid to be heated is stopped due to some trouble with the motor, supply of fuel is simultaneously interrupted and thereby combustion of fuel is stopped. Therefore, there is no fear of causing fire due to excessive heating of the apparatus.

(5) The amount of thermal energy generated by combustion can be changed merely by changing the rotational speed of the motor. This is because of the fact that the ratio of combustion air to fuel does not vary and also the temperature of fluid to be heated does not vary for the reasons as mentioned in the foregoing paragraph (2).

In spite of the above-mentioned advantageous features of the conventional apparatus, the type adapted for introduction of combustion air from the combustion air blower 102 and that of fluid to be heated from the blower 106 or the water feeding pump 108 by changing rotational speed of a single motor 110 has the following problems.

(1) When rotational speed is decreased to reduce the amount of thermal energy generated by combustion, in practice it is found that the temperature of the fluid to be heated is raised.

(2) When rotational speed is decreased to reduce the amount of thermal energy generated by combustion, the combustion state deteriorates, resulting in the amount of generated smoke being increased. Further, when the apparatus continues to be operated for a long period of time while the amount of thermal energy generated by combustion is low, carbon tends to be deposited over the inner wall of the combustion chamber. Deterioration of the combustion state in that way is attributable mainly to the fact that the size of fuel grains distributed in the combustion chamber becomes larger as rotational speed of the fuel distributor decreases. Specifically, combustion in the combustion chamber of the apparatus is achieved in the form of divergent flame and therefore the apparatus does not always operate with a constant ratio of flow rate of combustion air to flow rate of fuel. For the reason that the range over which the amount of thermal energy generated by combustion can be reduced without any deterioration of combustion state while the rotational speed is low is limited to at least 80% as measured relative to the maximum amount of thermal energy generated by combustion, when it is determined that the generated thermal energy is lower than 80% of maximum, the apparatus should be operated only for a short period of time.

(3) Piping is connected to inlet and outlet ports of the apparatus through which fluid to be heated is introduced and discharged. If this piping has high resistance against fluid flow, it causes the flow rate of fluid to be heated to decrease and the temperature increases abnormally. Accordingly, a decrease in the rotational speed of the motor to reduce the amount of thermal energy generated by combustion leads to a decrease in the flow rate of the fluid to be heated and an abnormal increase in the temperature of same. This means that there is no method of restoring the thus abnormally increased temperature to the initial normal level.

(4) When atmosphere pressure is low, for instance, in the case when the motorcar or like vehicle moves in a mountain area, the flow rate of combustion air decreases and normal combustion in the apparatus is inhibited. However, there is no way of correctively bringing it to the normal combustion state.

SUMMARY OF THE INVENTION

Thus, the present invention has been made with the foregoing problems in mind and its object resides in providing an improved apparatus for heating fluid by burning liquid fuel in a manner which assures that the flow rates of fuel, combustion air and the fluid to be heated are properly accommodated to operational conditions of the apparatus merely by inputting the required heating temperature for the fluid into an electronic control unit.

To accomplish the above object there is proposed according to the invention an apparatus, for heating fluid by burning liquid fuel, of the type including a cylindrical combustion chamber in which liquid is burnt, a combustion air introduction passage through which combustion air is introduced into the combustion chamber, a combustion gas discharge passage through which combustion gas is discharged from the combustion chamber, a flow passage through which fluid to be heated is introduced, the flow passage being disposed adjacent to the combustion chamber and the combustion gas discharging passage, a fuel pump for pumping fuel to the combustion chamber, a combustion air blower, means for feeding the fluid to be heated and a motor for rotating the combustion air blower and the means for forcibly feeding the fluid to be heated, wherein the improvement consists in that the apparatus further includes means for controlling the rotational speed of the motor, means for controlling the flow rate of fuel from the fuel pump, means for controlling the flow rate of combustion air which is introduced into the combustion chamber through the combustion air introduction passage and an electronic control unit into which a variety of parameters relative to the aforesaid means are inputted, the parameters being processed to individually control the means for controlling rotational speed of the motor, the means for controlling the flow rate of fuel and the means for controlling the flow rate of combustion air.

Typically, the parameters which are inputted into the electronic control unit are rotational speed of the motor and flow rate of fuel from the fuel pump.

Alternatively, the parameters which are inputted into the electronic control unit may be those as selected from a group of parameters comprising atmospheric pressure, temperature of combustion air, voltage of electric current for driving the motor, temperature of the same before and after heating and the required temperature to which same is to be heated.

Other objects, features and advantages of the invention will become more clearly apparent from a reading of the following description in conjunction with the accompanying drawings.

BRIEF DESCRIPTION OF THE DRAWINGS

The accompanying drawings will be briefly described below.

DESCRIPTION OF THE PREFERRED EMBODIMENTS

Now, the present invention will be described in greater detail hereunder with reference to the accompanying drawings which schematically illustrate preferred embodiments of the invention.

Figure 1:
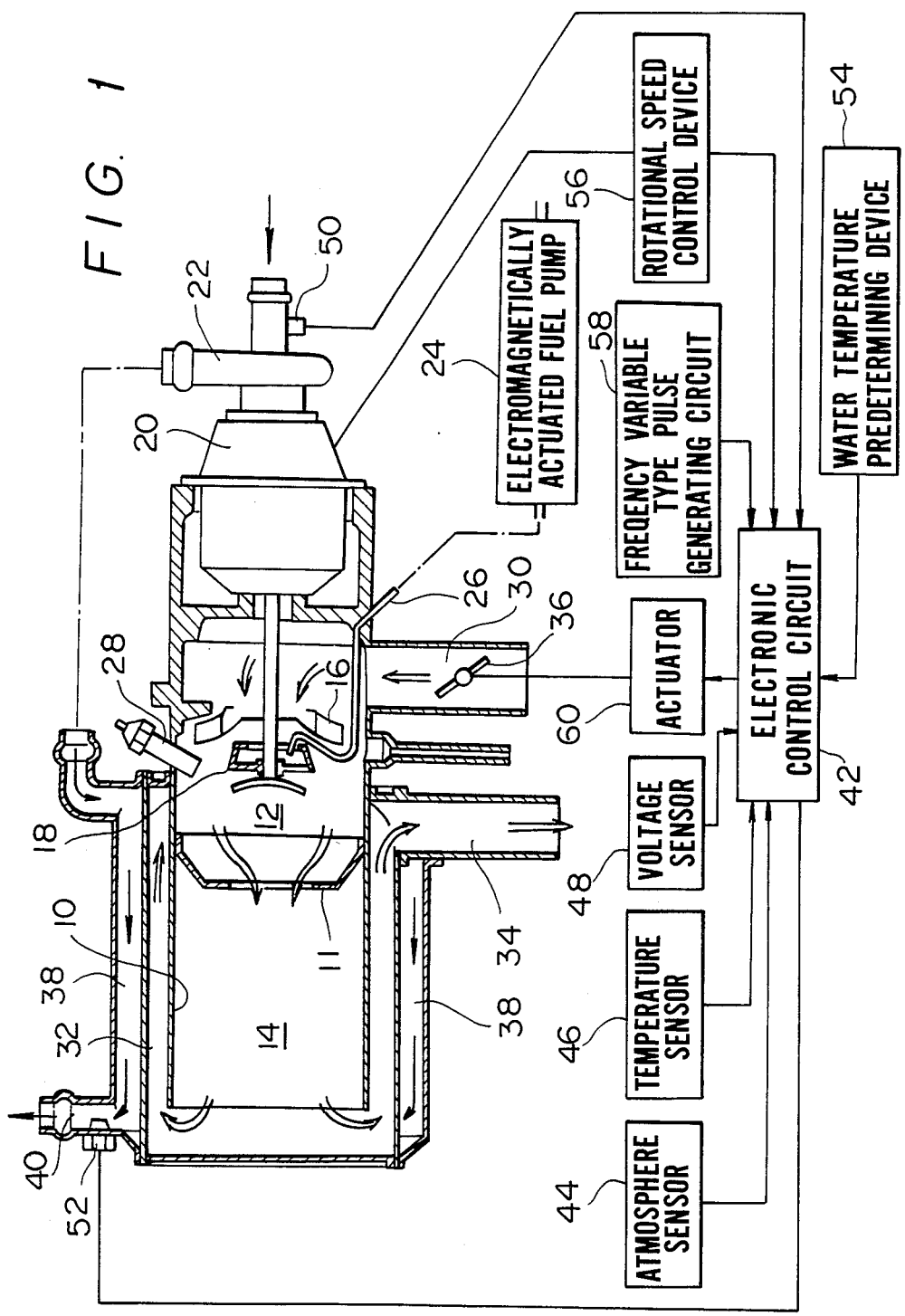
FIG. 1 is a schematic sectional view of an apparatus for heating fluid by burning liquid fuel according to the present invention (hereinafter referred to simply as apparatus), particularly illustrating the case where the fluid to be heated is water.

First, referring to FIG. 1, a cylindrical combustion chamber 10 comprises a primary combustion chamber 12 and a secondary combustion chamber 14 which are separated from one another by means of an orifice frame 11. As is apparent from the drawing, a combustion air blower 16 and a centrifugal type fuel distributor 18 are housed in the interior of the primary combustion chamber 12. The combustion air blower 16 and the centrifugal type fuel distributor 18 are arranged coaxially so that they can be rotationally driven by means of a single motor 20. It should be noted that a water feed pump 22 can be rotationally driven by means of the motor 20, because it is also arranged coaxially relative to the latter. Fuel discharged from an electromagnetically actuated fuel pump 24 is delivered to the centrifugal type fuel distributor 18 via a fuel pipe 26 and it is then ignited by activating an ignition plug 28. Combustion air is introduced into the combustion chamber 30 via an intake air passage 30 so that combustion takes place in the combustion chamber 10 where fuel is mixed with the combustion air. Thereafter, combustion gas is discharged to the outside from an exhaust port 34 via an annular combustion gas passage 32 which surrounds the combustion chamber 10. A throttle valve 36 is disposed in the middle of the intake air passage 30 so as to control the flow rate of combustion air to be introduced into the combustion chamber 10.

Water to be heated by the thermal energy of the combustion gas is introduced into an annular passage 38 from the water feed pump 22, the annular passage 38 being located outside the combustion gas passage 32, and it is then discharged through the discharge port 40 after heat exchange between the combustion gas in the combustion passage 32 and water in the annular passage 38.

An electronic control unit 42 is operatively associated with an atmosphere sensor 44, a temperature sensor 46 for detecting temperature of atmosphere or combustion air, a voltage sensor 48 for detecting voltage of electric power supplied to the motor 20, a water temperature sensor 50 disposed at the suction port of the water feed pump 22, a water temperature sensor 52 disposed at the discharge port 40 of the annular passage 50 and a water temperature predetermining device 54 for predetermining the temperature required for the water to be heated whereby signals generated by the above-mentioned components 44 to 54 are inputted into the electronic control unit 42 and they are then processed therein. As a result of processing the inputted signals in that way, control signals for controlling a rotational speed control device 56 for the motor 20, a frequency variable pulse generating circuit 58 for activating the electromagnetically actuated fuel pump 24 and an actuator 60 for controlling the operations of opening and closing of the throttle valve 36 are outputted from the electronic control unit 42. Since signals to be inputted into the electronic control unit 42 vary in dependence on the operational conditions of the apparatus of the invention, they should not be limited only to signals transmitted from the above-mentioned sensors; rather, there may be a necessity for signals from sensors other than the above-mentioned sensors. On the other hand, in certain cases some of the signals from the above-mentioned sensors may be not required.

Incidentally, arrow marks appearing as single line in FIG. 1 represent the flow of liquid to be heated and those appearing as double lines in the same drawing represents flows of combustion air and combustion gas.

Next, operation of the apparatus of the invention as illustrated in FIG. 1 will be explained.

(1) Controlling of rotation of the motor 20

In principle, control is effected in such a manner as to keep the rotational speed of the motor 20 constant the steps of inputting signals from the voltage sensor 48 into the electronic control unit 42 and then transmitting to the rotational speed control device 56 control signals for controlling rotational speed of the motor 20. When the load on the motor 20 varies remarkably due to high resistance against the flow of water, that is, the liquid to be heated (high resistance due to piping of long length) and therefore the rotational speed of the motor 20 fails to reach a target level, feedback controlling is effected by inputting rotational speed of the motor 20 into the electronic control unit 42. One reason why rotational speed of the motor 20 is kept constant is the need to keep the rotational speed of the centrifugal type fuel distributor 18 constant to assure that the size of fuel particles formed by the latter is kept constant and thereby maintain a stable combustion state. Another reason is to maintain constant the delivery of the combustion air blower 16 which serves as a standard for controlling an extent of opening of the throttle valve 36 as described later.

(2) Controlling of the flow rate of fuel to be pumped by means of the electromagnetically actuated fuel pump 24

A signal from the water temperature predetermining device 54 for predetermining the required water temperature, a signal from the water temperature sensor 50 disposed at the suction port of the water feeding pump 22 and a signal from the water temperature sensor 52 disposed at the discharge port 40 of same are inputted into the electronic control unit 42 whereby a control signal is outputted from the latter into the frequency variable type pulse generating circuit 58 to control the flow rate of fuel to be pumped from the electromagnetically actuated fuel pump 24.

(3) Controlling of the extent of opening of the throttle valve 36

A signal from the atmosphere sensor 44, a signal from the temperature sensor for detecting the temperature of the atmosphere (temperature in the area located in the proximity of the intake air suction port), a signal from the water temperature predetermining device 54 and a feedback signal from the pulse generating circuit 58 are inputted into the electronic control unit 52 whereby a control signal is outputted to the actuator 60 for the throttle valve 36 so as to control the flow rate of combustion air. Since the apparatus of the invention is operated responsive to a specific density of combustion air, determined on the basis of sensed atmospheric pressure and temperature, and the delivery of air is maintained constant due to the fact that the rotational speed of the combustion air blower 16 is controlled to reach a constant level, it is assured that a flow rate of combustion air is supplied which is properly determined relative to the feed rate of fuel to be supplied. When control is effected is such a manner that the rotational speed of the motor varies, arrangement is made such that signal from the rotational speed control device 56 is inputted into the electronic control unit 42 so as to properly control the flow rate of combustion air. It should be added that processing of a variety of signals as described above is achieved in accordance with a programmed map which is stored in the memory of the electronic control unit 42.

Next, the present invention will be described below, for the case where the fluid to be heated is air, with reference to FIG. 2. It should be noted that parts and components the same or similar to those in FIG. 1 are identified by the same reference numerals.

The cylindrical combustion chamber 10 is fully surrounded by a cover 62 which is located outside the former. The cover 62 is equipped with a blower 64 which serves to forcibly deliver the air to be heated. As is apparent from the drawing, the blower 64 is located downstream of the combustion chamber 10 and it is rotationally driven by means of a motor 20. The cover 62 is formed with a plurality of air suction ports 66 at the lefthand end thereof, as seen in the drawing, through which air to be heated is introduced into the space as defined between the cover 62 and the combustion chamber 10. Air to be heated enters the interior of the cover 62 and flows through the annular passage 68 between the cover 62 and the combustion chamber 10 so that it is discharged to the outside from the cover 62 by force of the blower 64.

The apparatus is provided with an air temperature sensor 70 at a position located in the vicinity of the air suction ports 66 so as to detect air temperature prior to heating and moreover it is provided with an air temperature sensor 72 at a position located downstream of the lower 64 so as to detect air temperature after completion of heating.

Structural differences between the apparatus according to this embodiment from that according to the foregoing one as illustrated in FIG. 1 are that in this embodiment the fluid to be heated is air, that the centrifugal type fuel distributor in the foregoing embodiment is replaced with a layer of firing wick 73 and that the blower 64 is disposed at a position located downstream of the combustion chamber 10. As will be readily understood from the above description, operation of the apparatus according to this embodiment is substantially same as that of the apparatus as illustrated in FIG. 1. Therefore, repeated description on operation of the apparatus is omitted.

Figure 3:
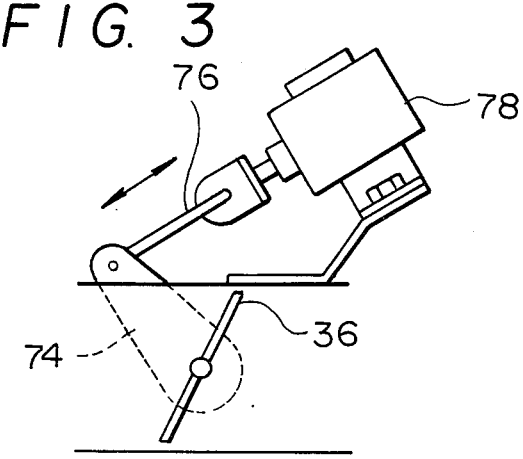
FIG. 3 is a schematic side view of an actuator for actuating a throttle valve disposed midway of the combustion air passage.
Figure 4:
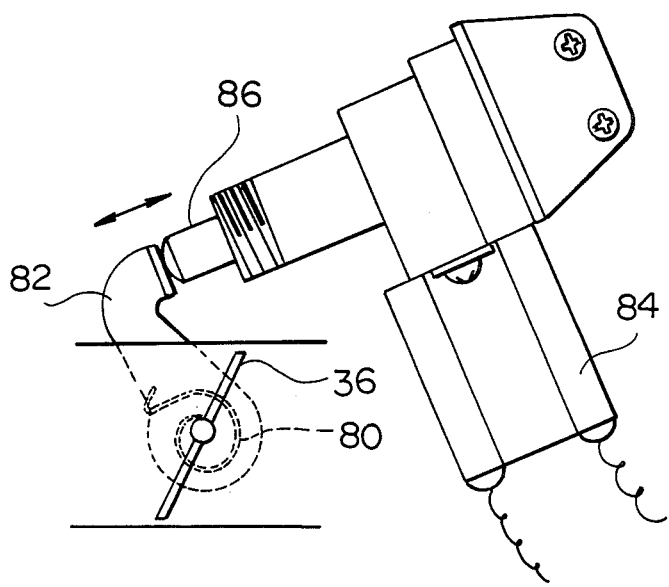
FIG. 4 is a schematic side view of another actuator for actuating the throttle valve.
Figure 5:
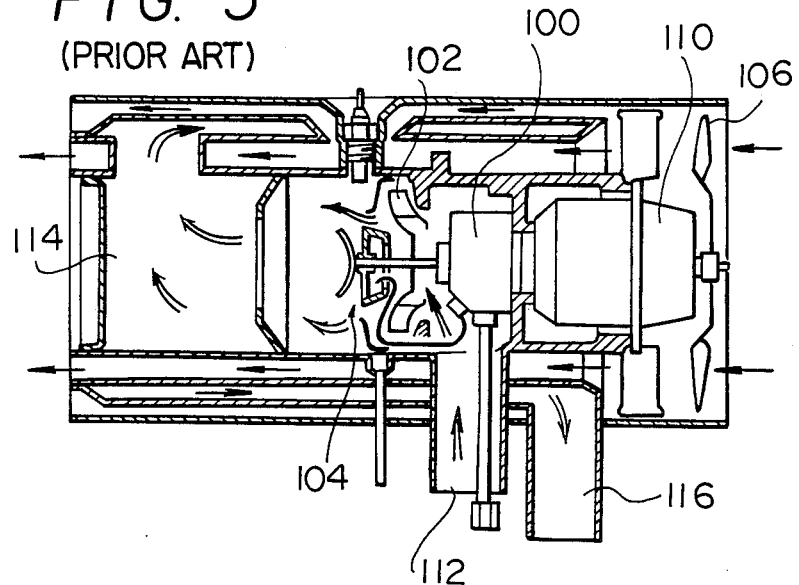
FIG. 5 is a schematic sectional view of the conventional apparatus, particularly illustrating the case where fluid to be heated is air.
Figure 6:
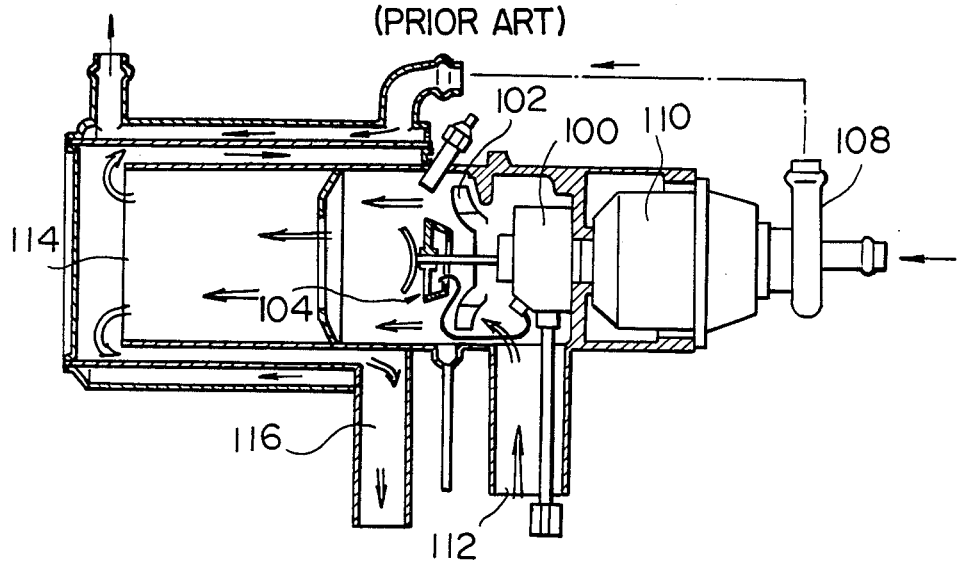
FIG. 6 is a schematic sectional view of the conventional apparatus, particularly illustrating the case where fluid to be heated is water.

FIGS. 3 and 4 illustrate typical examples of the actuator 60 for controlling the extent of opening and closing of the throttle valve 36. Specifically, FIG. 3 illustrates an example of the actuator which is so constructed that the throttle valve 36 is controlled stepwise by means of a solenoid operated valve 78 via a combination of lever 74 and rod 76. FIG. 4 illustrates an example of the actuator which is so constructed that a lever 82 adapted to turn in the direction whereby the value opens against the resilient force of a coiled spring 80 is controlled by means of a rod 86 which moves back and forth by operating a control motor 84. Forward and backward movement of the rod 86 is achieved by engagement of male thread on the rod 86 with a female thread in the shaft on a worm which meshes with a worm gear on the rotational shaft of the control motor 84.

Figure 2:
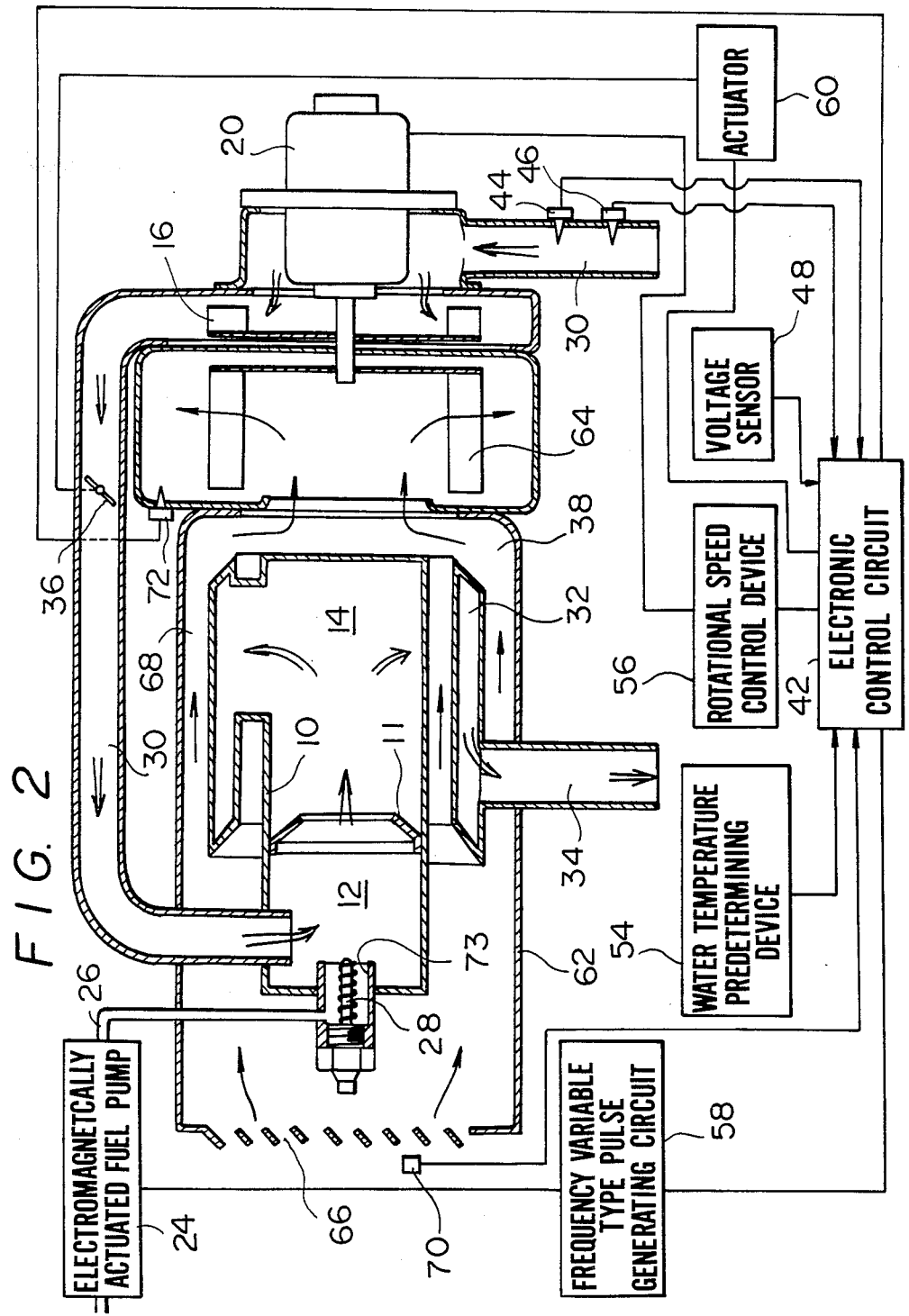
FIG. 2 is a schematic sectional view of the apparatus particularly illustrating the case where the fluid to be heated is air.

Various advantages and features of the apparatus of the invention as illustrated in FIGS. 1 and 2 are summarized below.

(1) Since the amount of thermal energy generated by combustion is so controlled that fluid temperature reaches the required temperature, there is no fear of causing fluctuation in temperature of fluid to be heated as is often seen in the case of an ON-OFF control system. When room warming and water temperature in a bath are controlled by operating the conventional apparatus in accordance with an ON-OFF control system, the temperatures of room air and water tend to fluctuate, preventing good air conditioning and pleasant bathing. On the contrary the apparatus of the invention is adapted to operate continuously with an amount of thermal energy which is so determined that room temperature and water temperature are raised up to a target level and therefore there is no fluctuation in temperature of room air and water. Thus, it is possible to enjoy pleasant air conditioning and bathing.

(2) The ratio of flow rate of combustion air to flow rate of fuel is properly controlled irrespective of how the amount of thermal energy generated by combustion varies. Thus, a good combustion state is maintained.

(3) The flow rate of fluid to be heated is not affected by fluctuation of the amount of thermal energy generated by combustion. Thus, there is no fear of causing excessive heating.

(4) The flow rate of combustion air is controlled by means of the throttle valve 36 disposed in the middle of the combustion air passage and moreover the combustion air blower 16 and the water feeding pump 22 or the blower 64 are adapted to be operated by rotation of the common motor 20. Thus, there is only the necessity for mounting a single motor.

(5) Since flow rates of fuel and combustion air are controlled separately from one another, they can be properly controlled by means of the electronic control unit 42 so as to reach a required temperature and keep it constant, the range of thermal energy production over which the apparatus can be operated under good combustion conditions is determined wider than in the case of the conventional apparatus.

While the present invention has been described above merely with respect to a few preferred embodiments, it should of course be understood that it also includes various changes or modifications which may be made in any acceptable manner without departure from the spirit and scope of the invention as defined by the appended claims.

What is claimed is:

1. In an apparatus for heating fluid by burning liquid fuel, said apparatus including a cylindrical combustion chamber in which liquid fuel is burnt, a combustion air introduction passage through which combustion air is introduced into said combustion chamber, a combustion gas discharge passage through which combustion gas is discharged from the combustion chamber, a flow passage adjacent the combustion chamber and the combustion gas discharge passage in which said fluid receives heat from the combustion gas, a fuel pump for pumping fuel to the combustion chamber, a combustion air blower, feed means for the fluid to be heated and a motor for rotating said combustion air blower and said feed means, the improvement comprising:

means for controlling the rotational speed of said motor;

means for controlling the fuel feed rate independent of said rotational speed;

means for controlling the flow rate of combustion air into the combustion chamber independent of said rotational speed and said fuel feed rate; and an electronic control unit into which a variety of parameters relative to said means are inputted, said parameters being processed to individually control said means for controlling the rotational speed of the motor, said means for controlling the fuel feed rate and said means for controlling the flow rate of combustion air.

2. An apparatus as defined in claim 1, wherein the parameters which are inputted into said electronic control unit include rotational speed of the motor and flow rate of fuel pumped from the fuel pump.

3. An apparatus as defined in claim 1, wherein the parameters which are inputted into said electronic control unit include one or more of atmospheric pressure temperature of combustion air, voltage of the electric current to the motor, temperature of the fluid to be heated prior to heating, temperature of the heated fluid and the selected temperature for the heated fluid.

4. An apparatus as defined in claim 1, wherein the means for controlling the flow rate of combustion air comprises a throttle valve adapted to open or close the passage through which combustion air is introduced into the combustion chamber and an actuator for actuating said throttle valve in response to a control signal transmitted from the electronic control unit.

5. The apparatus of claim 1 further comprising means for sensing the voltage to said motor and means for generating a motor control signal based on the sensed voltage and wherein said means for controlling the rotational speed of said motor is responsive to said motor control signal.

6. The apparatus of claim 5 additionally comprising means for detecting the rotational speed of said motor and means for comparing said detected rotational speed with a predetermined value for said rotational speed and for adjusting the motor control signal responsive to the difference between said detected and predetermined values for rotational speed.

* * * * *